US011286433B2

(12) United States Patent
Roe et al.

(10) Patent No.: US 11,286,433 B2
(45) Date of Patent: *Mar. 29, 2022

(54) COMPOSITIONS AND METHODS FOR REMEDIATING HYDROGEN SULFIDE IN HYDROCARBON BASED LIQUIDS

(71) Applicant: GAPS TECHNOLOGY, LLC, Slidell, LA (US)

(72) Inventors: Cliffton Lee Roe, Harrison Township, MI (US); Linda Schweitzer, Rochester Hills, MI (US)

(73) Assignee: GAPS Technology, LLC, Slidell, LA (US)

( * ) Notice: Subject to any disclaimer, the term of this patent is extended or adjusted under 35 U.S.C. 154(b) by 81 days.

This patent is subject to a terminal disclaimer.

(21) Appl. No.: 16/732,559

(22) Filed: Jan. 2, 2020

(65) Prior Publication Data

US 2020/0131444 A1     Apr. 30, 2020

Related U.S. Application Data

(63) Continuation of application No. 16/254,089, filed on Jan. 22, 2019, now Pat. No. 10,550,337, which is a continuation of application No. PCT/US2018/064015, filed on Dec. 5, 2018, which is a continuation-in-part of application No. PCT/US2018/050913, filed on Sep. 13, 2018.

(60) Provisional application No. 62/661,289, filed on Apr. 23, 2018, provisional application No. 62/702,960, filed on Jul. 25, 2018, provisional application No. 62/539,699, filed on Aug. 1, 2017.

(51) Int. Cl.
| | |
|---|---|
| *C10G 53/12* | (2006.01) |
| *C10G 19/02* | (2006.01) |
| *C10G 29/04* | (2006.01) |
| *C10G 29/02* | (2006.01) |
| *C10G 29/20* | (2006.01) |
| *C02F 1/50* | (2006.01) |
| *C02F 1/66* | (2006.01) |
| *C02F 103/36* | (2006.01) |
| *C02F 101/10* | (2006.01) |
| *C02F 103/18* | (2006.01) |
| *C02F 103/10* | (2006.01) |

(52) U.S. Cl.
CPC .............. *C10G 53/12* (2013.01); *C02F 1/50* (2013.01); *C02F 1/66* (2013.01); *C10G 19/02* (2013.01); *C10G 29/02* (2013.01); *C10G 29/04* (2013.01); *C10G 29/20* (2013.01); *C02F 2101/101* (2013.01); *C02F 2103/10* (2013.01); *C02F 2103/18* (2013.01); *C02F 2103/365* (2013.01); *C10G 2300/104* (2013.01); *C10G 2300/207* (2013.01); *C10G 2400/28* (2013.01)

(58) Field of Classification Search
CPC .......... C02F 1/50; C02F 1/66; C02F 2103/10; C02F 2103/18; C02F 2103/365; C02F 2101/101; C10G 19/02; C10G 29/02; C10G 29/04; C10G 29/20; C10G 53/12; C10G 2300/104; C10G 2300/207; C10G 2400/28

See application file for complete search history.

(56) References Cited

U.S. PATENT DOCUMENTS

| | | | |
|---|---|---|---|
| 2,592,523 A | 4/1952 | Ayers et al. | |
| 3,262,753 A | 7/1966 | Urano et al. | |
| 3,586,662 A * | 6/1971 | Thompson | A23J 1/14 530/377 |
| 3,708,421 A | 1/1973 | Rippie | |
| 3,897,219 A | 7/1975 | Sibeud et al. | |
| 3,931,394 A | 1/1976 | Toyama et al. | |
| 4,417,986 A | 11/1983 | Connaught et al. | |
| 4,515,759 A | 5/1985 | Burnes et al. | |
| 4,746,442 A | 5/1988 | Calemma et al. | |
| 5,595,750 A | 1/1997 | Jacobson et al. | |

(Continued)

FOREIGN PATENT DOCUMENTS

| | | |
|---|---|---|
| CN | 101544675 A * | 9/2009 |
| EP | 0 432 858 A1 | 6/1991 |
| WO | 2019036731 A2 | 2/2019 |

OTHER PUBLICATIONS

Cheng, et al., Extraction of Humic Acid from Lignite by KOH-Hydrothermal Method, Appl. Sci. 2019, 9(7), 1356, https://doi.org/10.3390/app9071356 (Year: 2019).*
CN-101544675-A, machine translation to English of Description, downloaded 2021 (Year: 2021).*
Shahrak, et a., Removal of Hydrogen Sulfide from Hydrocarbon Liquids Using Caustic Solution, Energy Sources, Part A: Recovery, Utilization, and Environmental Effects, 37:791-798, 2015 (Year: 2015).*
Shahrak, M.N. et al., "Removal of Hydrogen Sulfide from Hydrocarbon Liquids Using a Caustic Solution", article in Energy Sources Part A Recovery Utilization and Environmental Effects: Mar. 2015, pp. 791-798.

(Continued)

*Primary Examiner* — Chester T Barry
(74) *Attorney, Agent, or Firm* — Carrler Blackman & Associates, P.C.; Joseph P. Carrier; William D. Blackman

(57) ABSTRACT

A treatment process for preparing a remediated liquid from a contaminated liquid originally containing more than 5 ppm hydrogen sulfide ($H_2S$) and substantially without formation of precipitate, includes steps of steps of adding an aqueous solution containing at least one hydroxide compound at a collective concentration of 35-55 wt % to the contaminated liquid to achieve a concentration of 125-5000 ppm of the hydroxide compounds in the contaminated liquid, adding a fulvic acid and/or a humic acid to the contaminated liquid to achieve a concentration of 0.01-10 ppm of the acid(s) in the contaminated liquid, and dispersing the aqueous solution and the at least one organic acid in the contaminated liquid and allowing the aqueous solution and the at least one organic acid to react with the contaminated liquid for a period of time until a concentration of hydrogen sulfide in the contaminated liquid is reduced to ≤5 ppm.

20 Claims, No Drawings

(56) References Cited

U.S. PATENT DOCUMENTS

| | | | |
|---|---|---|---|
| 5,635,056 | A | 6/1997 | Brons et al. |
| 7,914,669 | B2 | 3/2011 | Martinie et al. |
| 9,028,679 | B2 | 5/2015 | Morris |
| 2008/0039344 | A1 | 2/2008 | Devereux et al. |
| 2009/0065399 | A1 | 3/2009 | Kocal et al. |
| 2010/0056404 | A1 | 3/2010 | Talley |
| 2014/0374104 | A1 | 12/2014 | Seth |
| 2015/0037274 | A1 | 2/2015 | Walia et al. |
| 2020/0277238 | A9* | 9/2020 | Yang .................. B01J 8/1836 |

OTHER PUBLICATIONS

Mike Nicholson/Tim O'Brian, Baker Petrolite Corporation, "Hydrogen Sulfide in Petroleum", pp. 28 found at www.coqa-inc.org/docs/default-source/meeting-presentations/20010531H25.pdf.

Heitman et al., "Oxidation and incorporation of hydrogen sulfide by dissolved organic matter", Chemical Geology 235 (2006) pp. 12-20.

Yang et al., "Novel Process of Removal of Sulfur Dioxide by Aqueous Ammonia-Fulvic Acid Solution with Ammonia Escape Inhibition", energy&fuels article 2016,30, pp. 3205-3218.

Pohlabein et al., "Experimental Evidence for Abiotic Sulfurization of Marine Dissolved Organic Matter", frontiers in Marine Science,, published Nov. 15, 2017, vol. 4, Article 364, pp. 1-11.

Shi et al., "Kinetic analysis of an anion exchange absorbent for CO2 capture from ambient air", Research Article Jun. 22, 2017, pp. 1-12.

Bauer et al., "Electron Transfer Capacities and Reaction Kinetics of Peat Dissolved Organic Matter", Environmental Science & Technology, vol. 41, No. 1, 2007, pp. 139-145.

Boggs et al., "Humic Substances In Natural Waters And Their Complexation With Trace Metals And Radionuclides: A Review", Argonne National Laboratory, Illinois, 60439, Chemical Technology Division, Jul. 1985.

Einsiedl et al., "Evidence for Incorporation of H2S in Groundwater Fulvic Acids from Stable Isotope Ratios and Sulfur K-edge X-ray Absorption Near Edge Structure Spectroscopy", Environmental Science & Technology, vol. 42, No. 7, 2008, pp. 2439-2444.

Einseidl et al., "Combined sulfur K-edge XANES spectroscopy and stable isotope analyses of fulvic acids and groundwater sulfate identify sulfur cycling in a karstic catchment area", Chemical Geology, 238, 2007, pp. 268-276.

Perlinger et al., "Addition of Hydrogen Sulfide to Juglone", Environmental Science & Technology, vol. 36, No. 12, 2002, pp. 2663-2669.

Senesi et al., "The Role of Free Radicals in the Oxidation and Reduction of Fulvic Acid", Soil Research Institute, Agriculture Canada, Soil Biol. Biochem. vol. 9, 1977, pp. 397-403.

Zhiguo Yu, "Electron Transfer Processes between Hydrogen Sulfide and Humic Substances—Implications for Anaerobic Sulfur Cycling in Freshwater Ecosystems", Dissertation to obtain the degree of Doctor of Natural Sciences at the Faculty of Biology / Chemistry / Earth Sciences.

Heitmann et al., "Oxidation and incorporation of hydrogen sulfide by dissolved organic matter", Chemical Geology 235 (2006) pp. 12-20.

Office Action dated Jun. 25, 2020 issued in co-pending U.S. Appl. No. 16/857,884.

Elliot, Louis D., "The freezing point curve of the system water-ammonia", The Journal of Physical Chemistry 28.8 (Aug. 1924): pp. 887-888, Figure 1.

* cited by examiner

COMPOSITIONS AND METHODS FOR REMEDIATING HYDROGEN SULFIDE IN HYDROCARBON BASED LIQUIDS

CROSS-REFERENCE TO RELATED APPLICATIONS

This application is a continuation of U.S. application Ser. No. 16/254,089, filed 22 Jan. 2019, which is a continuation of International Patent Application No. PCT/US2018/064015, filed on Dec. 5, 2018, which claims the benefit of priority to U.S. Provisional Patent Application Nos. 62/661,289, filed Apr. 23, 2018 and 62/702,960, filed Jul. 25, 2018, while PCT/US2018/064015 is a continuation-in-part of International Application PCT/US2018/050913, filed 13 Sep. 2018, which claims priority to U.S. Provisional Patent Application No. 62/539,699, filed Aug. 1, 2017. The entire subject matter of each of these priority applications is incorporated by reference herein.

BACKGROUND OF THE INVENTION

1. Field of the Invention

The present disclosure relates to novel treatment solutions and methods of using same for treating and remediating sulfur-containing compounds, primarily including hydrogen sulfide ($H_2S$), and other contaminants in hydrocarbon-petroleum based liquids and contaminated aqueous solutions, and substantially without formation of any precipitates, scaling or the like. More particularly, the present disclosure relates to such treatment solutions and methods in which the treatment solutions are added to the hydrocarbon-petroleum based liquids or contaminated aqueous solutions in a controlled and efficient manner which safely and efficiently remediates the contaminants down to acceptable levels, substantially without the formation of any precipitates, scaling or the like, and without otherwise detrimentally affecting the hydrocarbon-petroleum based liquids or contaminated aqueous solutions in any significant manner.

2. Background Art

Sulfur-containing compounds including hydrogen sulfide ($H_2S$) have long been recognized as undesirable contaminants in hydrocarbon or petroleum based liquids such as crude oil and liquified petroleum gas (LPG), as well as in contaminated aqueous solutions such as solutions extracted from the earth along with crude oil, natural gas and the like, which aqueous solutions may also be contain significant concentrations of salts and be considered brine. Herein "hydrocarbon based liquid" is used to indicated any hydrocarbon based liquid, including petroleum based liquids. Examples of hydrocarbon based liquids which may be treated with the treatment solutions and treatment methods of the present invention include those containing molecules of $CH_9$ to $CH_{32}$. $H_2S$ is a particularly undesirable contaminant because it is highly toxic, corrosive, etc. and generally petroleum based liquids such as crude oil should contain less than five ppm $H_2S$ in order to be acceptable for refining or other processing. While the amount of $H_2S$ in hydrocarbon based liquids can range from a few ppm to more than 100,000 ppm, crude oil from the ground typically contains ≤40,000 ppm $H_2S$, most often ≤2000 ppm $H_2S$, and will generally be somewhat acidic with a pH about 5 to 6. The $H_2S$ may be present in several forms, including $H_2S$ dissolved in a liquid, $H_2S$ as mercaptan sulfur and $H_2S$ content in vapor, but the majority is typically present as $H_2S$ content in vapor, particularly at higher concentrations, and the release of $H_2S$ in vapor or gaseous form is particularly toxic and dangerous.

Generally, much of the $H_2S$ in a hydrocarbon based liquid, such as crude oil, is in gaseous or vapor form. $H_2S$ gas has much greater solubility in hydrocarbon based liquids than in water, and at the high pressures at which crude oil exists underground, it is possible for the crude oil to have thousands and tens of thousands of ppm $H_2S$ therein. However, when the crude oil is brought up to ambient or atmospheric pressure much of the $H_2S$ gas therein may be released from the crude oil according to Henry's Law, and hence the need to remediate the $H_2S$ and prevent it from being released. The amount of soluble and gaseous $H_2S$ which can be in aqueous solutions is less than the amount which may be in hydrocarbon based liquids, but it still can be present in hundreds and thousands of ppm, and contaminated aqueous solutions will typically contains ≤1000 ppm $H_2S$. Generally, $H_2S$ is an acidic compound, crude oil as extracted from the ground and containing a typical amount of $H_2S$, e.g. ≤2000 ppm, which is mostly in the form gas dissolved in the crude oil, has a moderately acidic pH of about 5-5.5. Gaseous $H_2S$ does not exist in solution above a pH of about 7.

There are many known methods for remediating sulfur-containing compounds, including $H_2S$, from crude oil and other liquids. For example, M. N. Sharak et al., *Removal of Hydrogen Sulfide from Hydrocarbon Liquids Using a Caustic Solution*, Energy Sources, Part A: Recovery, Utilization, and Environmental Effects, 37:791-798, 2015, discuss that: the known methods include amine processes involving monoethanolamine (MEA), triazine, etc., treatment involving use of caustic material, iron oxide process, zinc oxide, molecular sieve, potassium hydroxide, and a hydrodesulphurization process; the amine treatment is usually the most cost effective choice for gas sweetening when significant amounts of acid gases exist; scrubbing of hydrogen sulfide using sodium hydroxide solution is a well established technology in refinery applications; caustic wash process is commonly used as a preliminary step in sweetening liquid hydrocarbons; and since the used solvent in this process cannot be easily regenerated, caustic scrubbers are most often applied where low acid gas (H2S) volumes must be treated.

$H_2S$ abatement achieved by a conventional amine treatment process which uses an amine such as monoethanolamine (MEA) or triazine for treating $H_2S$ in crude oil. However, with the conventional amine treatment process, while the $H_2S$ may be initially remediated or abated down to acceptable levels, the sulfur contained in the treated oil may undesirably revert back to $H_2S$ over time, especially if the treated oil is heated.

Somewhat similarly, it is also known that there are bacteria which ingest sulfur compounds, and hence may reduce the amounts of sulfur contaminants in hydrocarbon based liquids or contaminated aqueous solutions. However, when the bacteria die and decompose this undesirably releases the sulfur back into the hydrocarbon based liquids or contaminated aqueous solutions.

A typical caustic treatment used to remediate $H_2S$ in crude oil involves use of a caustic aqueous solution consisting of up to 20% NaOH by weight. The water and caustic material are used to extract $H_2S$ from the crude oil into solution, dissociating $H_2S$ to HS— ion at higher pH, which shifts the equilibrium of $H_2S$ gas from oil to water. Then, the HS— can react with sodium to form NaHS (sodium bisulfide), or with $S_2$— to form $Na_2S$ (sodium sulfide), for example, plus water as a byproduct according to the following equations.

$$H_2S+NaOH \rightarrow NaHS+H_2O \qquad (1)$$

$$NaHS+NaOH \rightarrow Na_2S+H_2O \qquad (2)$$

Generally, the conventional caustic treatment methods are limited to using caustic solutions of only up to 20 weight percent NaOH because the conventional methods are designed and intended to be partly a liquid-liquid extraction, and partly a chemical reaction to convert the $H_2S$ gas to a solid sulfurous species. It is conventionally understood that a certain amount of water is needed to permit the chemical reactants to contact with the crude oil or other petroleum based liquid. The larger amounts of water contained in the conventional caustic treatment solutions permit a greater amount of liquid-liquid extraction. Also, it is known that use of excessive amounts of NaOH may damage the crude oil, as well as metal components used handling the crude oil such as pipes and tanks.

Additionally, some of the $H_2S$ may be converted into sulfur dioxide ($SO_2$) gas, e.g., upon stirring which allows air containing oxygen to get into the oil, which may be released from the treated petroleum based liquid, depending on the pressure under which the treated liquid is kept. Generally, hydroxides including NaOH are reducing agents and would not produce sulfur dioxide or elemental sulfur if the treated hydrocarbon based liquid is not exposed to air. However, if the oil is exposed to air, the sulfide/bisulfide can be oxidized to $SO_2$ or to elemental sulfur. All sulfide species are the same oxidation state ($-2$) and NaOH is not changing the oxidation state. Similar reactions would occur for other hydroxides included in the treatment solution. Relative to any such sulfur dioxide ($SO_2$) gas, as well as any other gases that may be released from the treated crude oil, it would be necessary as a safety measure to provide some head space in a closed tank or other closed vessel transporting the treated liquid to assure that the pressure does not get excessively high.

Recently, the present inventors have proposed another process, as set forth in U.S. Provisional Patent Application No. 62/539,699 and International Application PCT/US2018/050913, for remediating sulfur-containing compounds, including $H_2S$, from hydrocarbon based liquids including crude oil, and from contaminated aqueous solutions, using an aqueous treatment solution containing primarily a high concentration of one or more hydroxides. The recently proposed treatment solution may include other, secondary components such as an anti-bacterial agent for killing any undesired bacteria that may be present and grow in the treated liquids, and/or an agent for causing some gas(ses) in a treated liquid to be released, but the primary component is the collectively high concentration of one or more hydroxides. In the recently proposed treatment process, the recently proposed treatment solution is added to the hydrocarbon based liquids or aqueous solutions at appropriate dosage rates depending on multiple factors such that the hydroxide(s) efficiently remediate the sulfur-containing compounds within a desired time period, and without otherwise detrimentally affecting the hydrocarbon-petroleum based liquids or contaminated aqueous solutions in any significant manner.

According to their recent proposal, the present inventors have discovered that the conventional treatment method using a caustic aqueous solution consisting of up to 20% NaOH by weight is not efficient, and that the $H_2S$ can be much more efficiently remediated using the recently proposed treatment solution containing a very high concentration of hydroxides, e.g., including as a primary component 35-55 weight percent, and preferably at least 45 weight percent, of one or more hydroxides, such as sodium hydroxide (NaOH) and potassium hydroxide (KOH). $H_2S$ gas is more soluble in oil than in water, so that a rate-limiting step, in the remediation of $H_2S$ from crude oil, is typically the mass transfer of $H_2S$ from the oil phase into the aqueous phase.

More particularly, they have discovered that: 1) the liquid-liquid extraction aspect of the conventional methods is actually not that important in comparison to the chemical reaction aspect, e.g., because the initial solubility of $H_2S$ into water, as given by Henry's Law, is low; 2) the larger amounts of water used in aqueous treatment solutions according to the conventional methods also function to dilute the NaOH and transfer the $H_2S$ from the hydrocarbon liquid into the water without abating the $H_2S$, which is undesirable because this slows the process needed to produce ionized HS— and $S_2$— ions that allow more of the $H_2S$ contained in the petroleum liquids into solution, and 3) it is much more efficient and effective to remove the sulfur-containing compounds primarily though a chemical reaction process and to a much lesser degree a liquid-liquid extraction though use of an aqueous treatment solution containing a collectively high concentration of one or more hydroxides, provided that the amount of hydroxide(s) used is generally limited within a stoichiometrically-based range, although use of higher amounts of the hydroxide(s) may be advantageous in some situations and generally will not cause any significant problems. Relative to 1) it should be noted that equation (2) above is reversible, so large amounts of water hydrolyze the sodium sulfide ($Na_2S$) back to NaOH and NaHS. In other words, equation (2) in the reverse direction is a hydrolysis reaction.

According to their recent proposal, the present inventors have found that a highly concentrated aqueous treatment solution according to an exemplary embodiment comprising primarily one or more hydroxides, such as sodium hydroxide (NaOH) and/or potassium hydroxide (KOH) at a collective concentration of 35-55 weight percent, and preferably at least 45 weight percent, in water is very effective for treating hydrocarbon based liquids including crude oil, diesel fuel, etc. for remediating contaminants in the hydrocarbon based liquids, including $H_2S$ and other sulfur-containing contaminants, provided that the amount of the aqueous treatment solution used for treating the liquids is maintained within an appropriate range, which can vary depending on several factors, including the specific composition of the liquid to be treated, reaction time permitted and the type of remediation desired, e.g., whether there are any restrictions on the amounts of precipitate(s) and gases that may be released from the treated petroleum based liquids. Sodium hydroxide is very effective for use in the treatment solution because it does not harm the petroleum based liquids when used in appropriate amounts, and is relatively inexpensive, although use of a combination of hydroxides is advantageous for more completely reacting with most or all of the sulfides in the petroleum based liquids, noting that there are more than 300 species of sulfur compounds, although hydrogen sulfide $H_2S$ is by far the main contaminant that must be remediated. For example, some other species of undesirable sulfur compounds include ethyl mercaptan ($CH_3CH_2SH$), dimethyl sulfide ($C_2H_6S$), isobutyl mercaptan ($C_4H_{10}S$) and methyl thiophene ($C_5H_6S$). Potassium hydroxide is more effective, than sodium hydroxide for reacting with some species of sulfides. Hence, the treatment solution containing potassium hydroxide (KOH) together with the sodium hydroxide achieves a more complete reaction with all of the sulfides contained in the hydrocarbon based liquids in comparison to just using a concentrated solution of sodium hydroxide. Such treatment solution according to the recent proposal is highly alkaline with a pH of 13-14.

In a treatment process for remediating contaminated liquids according to the inventors' recent proposal, their recently proposed treatment solution may be added at a standard dosage rate of 0.25-6.0 ml of the treatment solution/liter of the liquid being treated, preferably 1.0-5.0 ml of the treatment solution/liter of the liquid being treated, which corresponds to approximately 125-3000 ppm of hydroxide(s) in the liquid being treated. Within a relatively short time period such as 15 minutes-24 hours after the recently proposed treatment solution is added to the liquid being treated, it is very effective for remediating the $H_2S$ and other sulfides in most hydrocarbon based liquids including crude oil and most contaminated aqueous solutions down to safe, acceptable levels. The specific treatment dosage within the discussed range depends on the characteristics of the particular liquid being treated, including its viscosity or API density, the particular contaminants it contains, the levels of such contaminants, and allowed reaction time (The term API as used herein, is an abbreviation for American Petroleum Institute). At this dosage level, the $H_2S$ may typically, for example, be remediated down to less than 5 ppm from initial concentrations of up to 40,000 ppm, and without generating any particularly harmful substances. For example, when the treatment solution includes sodium hydroxide (NaOH) as the primary hydroxide therein, e.g., at least 90% of all hydroxides in the solution, much of the $H_2S$, e.g., at least 60% is converted into sodium bisulfide (NaHS) according to the reaction (1) above, which remains dissolved in the treated petroleum liquid, and does not create any significant problems that would need to be addressed. Additionally, some of the $H_2S$ may be converted into sulfur dioxide ($SO_2$) gas which may be released from the treated petroleum based liquid, depending on the pressure at which the treated liquid is kept. If the concentration of $H_2S$ is higher than 20,000 ppm it may be necessary to increase a dosage amount appropriately above the standard dosage rate, which may generally involve linear scalability. Very desirably, the recently proposed treatment process is generally not reversible in relation to the $H_2S$ and other sulfur contaminants which have been remediated, e.g., even if the treated liquid is heated up to 180° F. for a period of days or weeks, any remediated sulfur compounds remaining in the treated liquids do not revert back to $H_2S$.

Within the discussed range of 0.25-6.0 ml of the treatment solution/liter of petroleum based liquid, preferably 1.0-5.0 ml of the treatment solution/liter of the liquid being treated, the appropriate dosage rate is substantially, linearly scalable in relation to most or all of the various characteristics. For example, if the amount of $H_2S$ is relatively low, e.g. 20 ppm-100 ppm the dosage rate may be toward the lower end of the range, whereas if the amount of $H_2S$ is relatively high, e.g. 10,000 ppm-20,000 ppm the dosage rate may be toward the higher end of the range, and dosage rates for intermediate amounts of $H_2S$ would be at correspondingly intermediate values of the range. Similar, linear scalability applies based on the viscosity—API gravity of the liquid and reaction times allowed.

Based on the investigations of the present inventors, they have found that if the dosage amount of the recently proposed treatment solution, containing one or more hydroxides such as NaOH, KOH, and possibly an antibacterial agent such as potassium silicate, is appropriately within the standard dosing rate range, the reaction(s) between the treatment solution and the sulfide compounds in the hydrocarbon based liquid, particularly $H_2S$, proceed quickly and efficiently. By contrast, they have also found that if the amount of the treatment solution added is outside of this range, the reactions between the treatment solution and the sulfide compounds in the hydrocarbon based liquid may not proceed quickly and/or efficiently. However, the inventors have further determined that if an intentionally excessive dosage of the recently proposed treatment solution is added to a liquid being treated, e.g., 2-5 times the standard dosage rates discussed above, this will likely cause contaminants and remediated contaminants in the treated liquid to precipitate out of the treated liquid, which may be desirable in some situations, and will increase the cost of the treatment. Further, the excess dosages of hydroxides such as NaOH and KOH generally do not have any significantly adverse effects on the treated petroleum based liquids, although application of a very excessive amount of the solution, e.g., ten times the normal amount, may render the treated petroleum based liquid caustic which could be damaging to metals such as steel and aluminum used for containing and transporting the treated liquids.

While the known methods for remediating sulfur-containing compounds, including $H_2S$, from hydrocarbon based liquid and aqueous solutions, especially the methods and treatment solutions according to the present inventors' recent proposal are generally effective for remediating the $H_2S$ and other contaminants in the liquids, they remain to be improved on, particularly in relation to preventing formation of precipitate(s), scaling and the like from the treated liquids. There remains in the art a need for treatment solutions and treatment methods for remediating sulfur-containing compounds, including $H_2S$, from crude oil, other hydrocarbon based liquids, and contaminated aqueous solutions, where such treatment solutions and methods are improved in terms of effectiveness in completely remediating the sulfide compounds, as well as in terms of efficiency in quickly remediating the sulfide compounds at a reasonable cost, while generating essentially no precipitate(s), scaling and the like in the treated liquids. There is also a need for flexibility in the ability to perform the treatment method at essentially any location, e.g., directly at a well head or an oil field where crude oil is being extracted, while the crude oil is being transported to a refinery, or other location.

SUMMARY OF THE INVENTION

An object of the present invention is to satisfy the above needs in the art.

According to a first aspect of the present invention, a treatment solution and treatment process according to the present inventors' recent proposal are modified to include, or is used in combination with, other component(s) which generally are not involved in remediating the $H_2S$ and other contaminants, but function to better assure that no precipitates, scale and the like will be generated from the treated hydrocarbon based liquids or contaminated aqueous solutions for a period of time such as hours, days, or months. Most notably, according to the first aspect of the present invention an appropriate amount of one or more organic acids, such as fulvic acid and humic acid, is added to the liquid being treated together with an appropriate dosage of a treatment solution according to the present inventors' recent proposal. Use of the organic acid(s) together with the recently proposed treatment solution assures that the treatment process will not only remediate the undesired contaminants, including $H_2S$, in the liquids being treated in a safe, controlled and efficient manner down to levels deemed to be safe or below, but will do so substantially without formation of any precipitate(s), scale or the like while the liquids are being treated, transported, and stored for a period of time such as hours, days or weeks.

In the treatment process according to the first aspect of the present invention, the remediated sulfide compounds mostly remain in the treated liquids, but in the form of other sulfur based compounds which are not toxic or highly dangerous, unlike the $H_2S$ before the remediation In the treatment process according to the first aspect of the present invention, the organic acid(s) and recently proposed treatment solution may be separately added to the liquid being treated or, in the alternative, the organic acid(s) may be added to the recently proposed treatment solution to form a modified treatment solution, which is then added in an appropriate dosage amount to the liquid being treated. The alternative approach is more convenient as a practical matter because the modified treatment solution may be prepared in advance at any convenient location, transported in a single container to another location where it is added to the liquid being treated, and permits all components to be added to the liquid being treated in a single dosage. Further, testing shows that even if the several components are mixed together to form a modified treatment solution and the modified solution is stored for a month or so, there are no appreciable changes to the composition of the modified solution and it remains effective for use in remediated contaminated hydrocarbon based liquids and contaminated aqueous solutions.

In such treatment process according to the first aspect of the present invention, the standard dosage of the inventors' recently proposed treatment solution, i.e., within a range of 0.25-6.0 ml/liter of the liquid being treated, preferably within a range of 1.0-5.0 ml/liter of the liquid being treated, is effective for safely and efficiently remediating the $H_2S$ and other contaminants therein down to appropriate levels within a period of time such as 15 minutes-24 hours without creating any significant problems for the treated liquids, substantially the same as in the recently proposed treatment process. Again, the most appropriate dosage rate base within the discussed range will be based on specific characteristics of the treated liquid and other factors as discussed above. However, according to the first aspect of the present invention an appropriate amount of the organic acid(s) is also added to the treated liquid at a dosage rate that will typically result in a concentration of the organic acid(s) in the liquid being treated being in a normal range of 0.01-10 ppm, preferably 0.1-3 ppm, whether the liquid is a hydrocarbon based liquid or contaminated aqueous solution. Within such range, the most appropriate dosage rate of the organic acid(s), like the most appropriate dosage rate of the recently proposed treatment solution, largely depends on: 1) the amount of $H_2S$ and other sulfur containing contaminants in the liquid being treated; 2) the viscosity of the liquid; and 3) the amount of time permitted for reacting the treatment solution with the liquid being treated, although heating and/or mixing of the liquid being treated will reduce the viscosity of the liquid and will also reduce the amount of time required for properly remediating the $H_2S$ and other contaminants in the liquid. The dosage amount of organic acid(s) is substantially, linearly scalable within the discussed range based on these factors.

In the recently proposed treatment process which adds only a standard dosing rate of the treatment solution according to the present inventors' recent proposal to a liquid being treated, there may be little or no precipitate(s), scaling or the like formed from the treated liquids, but even small amounts of precipitate(s), scaling or the like may be undesired or unacceptable in some situations. In the treatment process according to the first aspect of the present invention, however, the organic acid(s) which are also added to the liquids being treated assure that substantially no precipitate(s), scaling or the like will be formed from the treated liquids while they are being treated, transported and/or stored for a period of time such as hours, days or weeks. Further, to any extent that there is a increased likelihood that precipitate(s), scaling or the like may be formed in a treated liquid, e.g., the treated liquid contains an especially high content of $H_2S$ and other sulfides requiring a larger dosage of the treatment solution according to the inventors' recent proposal and/or the liquid being treated contains a high content of rag components such as organic matter, an increased amount of the organic acid(s) may be added to the treated liquid beyond the normal range of 0.01-10 ppm, preferably 0.1-3 ppm, to assure that substantially no precipitate(s), scaling or the like will be formed.

One particular application in which it is very important to assure that no precipitates, scale and the like will be generated from the treated hydrocarbon based liquids is when crude oil directly from the ground is being transported via tanker truck or other vessel to a major pipeline, which then transports the crude oil to a refinery. The major pipeline generally, will not accept crude oil containing more than 5 ppm $H_2S$. By treating the crude oil with a standard dosage of the treatment solution according to the present inventors' recent proposal, this would be effective to reduce the $H_2S$ content down to 5 ppm or less, but it is quite possible that there would be some precipitates and/or scaling will be formed or deposited on surfaces of the tanker truck or other vessel transporting the crude oil, which would be undesirable. However, by also adding an appropriate amount of the organic acid(s) to the treated liquid according to the first aspect of the present invention, this assures that essentially no precipitates or scaling will be formed from the treated hydrocarbon based liquids, including crude oil. Significantly, the treatment solution and process according to the present invention do not have any particularly detrimental effects on the treated liquids, but do significantly improve some characteristics of the treated liquid beyond remediating the $H_2S$ and other contaminants down to safe, acceptable levels. For example, a treated hydrocarbon based liquid such as crude oil will not only have $H_2S$ levels reduced to substantially zero, but will also have a substantially neutral pH of about 7, so that it will cause less problems for the transporting vessel, the major pipeline and the distillation process in comparison to the untreated crude oil which will typically include up to 2000 ppm $H_2S$ and have a somewhat acidic pH of 5-5.5. Further, testing performed on treated crude oil shows that the content of light end components of the treated crude oil, including benzene, tends to be improved—increased somewhat by the treatment process. Moreover, the treated crude oil having improved characteristics will typically be more valuable than the untreated crude oil and can be sold at a higher price, e.g., $5 to $10 per barrel. While the treated crude oil may contain some residual amounts of hydroxide(s), organic acid(s), and/or other components added during the treatment process, these are not particularly harmful to crude oil itself, the transporting vessel and the major pipeline.

According to a second aspect of the present invention, a treatment process according to the present inventors' recent proposal is further modified by also adding a small amount of monoethanolamine or MEA ($C_2H_7NO$) to the treated liquid, along with appropriate amounts of the recently proposed treatment solution and of the organic acid(s) such as discussed in relation to the first aspect of the present invention. An appropriate small amount of the MEA to be added in the treatment process according to the present invention will typically correspond to a concentration of 0.5-15 ppm, and preferrably 1.0-10 ppm, of the MEA in the hydrocarbon based liquid or aqueous solution being treated. Within such range, again, a most appropriate dosage rate for the MEA largely depends on a few factors, e.g., 1) the amount of $H_2S$ and other sulfur containing contaminants in the liquid being treated; 2) the viscosity of the liquid being treated; and 3) the amount of time permitted for reacting the treatment solution with the liquid being treated, while noting that heating and/or mixing of the treated liquid will typically reduce the viscosity of the liquid and reduce reaction time required for sufficiently remediating the $H_2S$ and other contaminants in the treated liquids. The amount of MEA is generally, linearly scalable within the discussed range based on these three factors.

MEA added in small amounts to the treated liquids according to the effectively functions as an anti-scaling agent and is also more effective at remediating some species of sulfur compounds than are the hydroxide(s) in the recently proposed treatment solution. Hence, the treatment process including MEA according to the present invention achieves a more complete remediation of various species of sulfur containing compounds.

This is different from the conventional amine treatment process in which relatively large amounts of MEA are added to hydrocarbon based liquids such as crude oil as the primary component to remediate the $H_2S$ in the hydrocarbon based liquids. MEA exothermically reacts with hydroxide(s) such as NaOH and KOH. Correspondingly, the higher the dosage of MEA added for treating a liquid in the treatment process of the present invention the greater the amount of the hydroxide(s) in the recently proposed treatment solution, which is also added to the treated liquid as part of the treatment process, will react with the MEA rather than with $H_2S$ and other sulfur containing contaminants in the treated liquid. This would be counterproductive and undesirable. Hence, only a small amount of MEA within the discussed range will typically be added in the treatment solutions according to the second aspect of the present invention, i.e., an amount sufficient to function as an anti-scaling agent, but not so large as to significantly reduce the effectiveness of the hydroxide(s) remediating the $H_2S$ and other sulfur containing contaminants. As with the organic acid(s), the MEA may be added to the recently proposed treatment solution so as to form a modified treatment solution which is then added to the liquid being treated, or the MEA may be added to the liquid being treated separately from the recently proposed treatment solution and from the organic acid(s). Again, however, even if MEA is added to the recently proposed treatment solution and stored for a month or so, testing shows that this does not change the content of the components of the modified treatment solution to any appreciable extent.

INTENT OF DISCLOSURE

Although the following disclosure offered for public dissemination is detailed to ensure adequacy and aid in understanding of the invention, this is not intended to prejudice that purpose of a patent which is to cover each new inventive concept therein no matter how it may later be disguised by variations in form or additions of further improvements. The claims at the end hereof are the chief aid toward this purpose, as it is these that meet the requirement of pointing out the improvements, combinations and methods in which the inventive concepts are found.

DETAILED DESCRIPTION OF PRESENT EXEMPLARY EMBODIMENTS

Treatment Solutions and Treatment Methods—Exemplary Embodiments

According to exemplary embodiments of the present invention, there is provided treatment solutions and treatment processes which use the treatment solutions for treating hydrocarbon or petroleum based liquids such as crude oil, diesel fuel, etc., as well as for treating contaminated aqueous solutions such as water extracted from the ground with crude oil and natural gas, to remediate hydrogen sulfide ($H_2S$), other sulfur-containing compounds, and other contaminants in such liquids down to acceptable levels, while at the same time assuring that that substantially no precipitates, scale or the like will be generated from the treated liquids for a period of time such as hours, days, or months.

Remediating $H_2S$ is a primary focus and advantage of the treatment solutions and processes according to the exemplary embodiments of the present invention because $H_2S$ is very toxic and corrosive, is typically present at elevated levels in crude oil and natural gas as extracted from the ground, as well as in aqueous solutions extracted from the ground with crude oil or natural gas, and the acceptable content of $H_2S$ in hydrocarbon based liquids and aqueous solutions is highly limited and regulated. The inventors' recently proposed treatment solution and treatment process are very effective and efficient at remediating $H_2S$ in hydrocarbon based liquids and contaminated aqueous solutions as disclosed in PCT/US2018/050913. In addition to remediating $H_2S$, however, in some situations it is also very important that substances generated in the remediation of $H_2S$ and other sulfur-containing compounds, as well as other contaminants present in the treated liquids, not be released from the treated liquids as precipitate(s), scaling or the like while the liquids are being treated, transported or stored for periods of time, and this is another important focus of the present invention. One particular application in which it is very important to assure that no precipitates, scale and the like will be generated from a treated hydrocarbon based liquid is when crude oil directly from the ground is being transported via tanker truck or other vessel to a major pipeline, which then transports the crude oil to a refinery. In relation to treated aqueous solutions, such solutions are sometimes used in industrial applications, including for boilers, chillers, hide tanning processes, processes involving wood pulp and paper, etc. wherein it is important that precipitates, scaling and the like not be released or generated from the treated aqueous solutions.

A treatment solution and treatment process according to exemplary embodiments of the present invention are modifications of the treatment solutions and treatment processes recently proposed by the present inventors as disclosed in PCT/US2018/050913, and generally involve use of the recently proposed treatment solution for efficiently remediating $H_2S$ and other contaminants in hydrocarbon based liquids and aqueous solutions, together with one or more additional substances which function to prevent the remediated contaminants and other contaminants in the treated liquids from being released as precipitate(s), scaling, or the like. In the treatment processes according to the present invention, an appropriate amount of the recently proposed treatment solution is used and functions to remediate the $H_2S$ and other contaminants in the treated liquids down to acceptable levels in essentially the same manner as explained in PCT/US2018/050913, while the additional substance(s) are added in appropriate amount(s) and function to assure that substantially none of the remediated contaminants and other contaminants in the treated liquids will be released from the treated liquids as precipitate(s), scaling or the like while the liquids are being treated, transported or stored for periods of time. According to a present exemplary embodiment of the invention, such additional substances primarily include at least organic acid, such as fulvic acid and humic acid. When such organic acid(s) are also added to the treated liquids, even at relatively low concentrations, e.g., 3 ppm or less, they are very effective at preventing formation of precipitates, scale and the like from the treated liquids. Another substance which may also be used in an embodiment of a treatment process according to the present invention is monoethanolamine (MEA). When also added to the treated liquids at relatively low concentrations, e.g., 15 ppm or less, MEA functions effectively as an anti-scaling agent, and also provides other beneficial functions, including remediation of some other contaminants, as discussed herein.

For a clear understanding of the present invention, below there is first presented (I) a discussion of the inventors' recently proposed treatment solution and treatment process such as disclosed in PCT/US2018/050913 for remediating $H_2S$ and other contaminants, followed by (II) a discussion of embodiments of a treatment solution and treatment process according to the present invention, in which the additional substance(s) are used together with the inventors' recently proposed treatment solution and treatment process for treating various contaminated liquids to remediate $H_2S$ and other contaminants in the liquids, while preventing formation of precipitate(s), scaling and the like.

(1) The Treatment Solution and Treatment Process According to the Inventors' Recent Proposal According to the inventors' recent proposal as disclosed in PCT/US2018/050913, a treatment solution appropriate for remediating $H_2S$, other sulfur-containing compounds, and other contaminants in contaminated hydrocarbon based liquids and aqueous solutions is aqueous based and may primarily include one or more hydroxides, such as sodium hydroxide (NaOH) and potassium hydroxide (KOH), at a collective, high concentration of 35-55 weight percent, and preferably at least 45 weight percent, of the aqueous treatment solution, and a treatment process for remediating $H_2S$ and other contaminants in the liquids being treated includes steps of adding a standard dosage of such treatment solution within a range of 0.25-6.0 ml/liter of the liquid being treated, preferably within a range of 1.0-5.0 ml/liter of the liquid being treated, which corresponds to approximately 125-3000 ppm of hydroxide(s) in the liquid being treated, and permitting the treatment solution to react with the liquid being treated for a time period of 15 minutes-24 hours. The discussed standard dosage amount in the treatment process according to the inventors' recent proposal is generally effective for $H_2S$ concentrations up to 40,000 ppm. If the concentration of $H_2S$ is higher than 40,000 ppm it may be necessary to increase standard dosage amount of the recently proposed treatment solution appropriately, which may generally involve linear scalability. The recently proposed treatment process may cause precipitate(s), scale and the like, as well as gas(ses), to be generated and/or released from the treated liquids, and to any extent this occurs the treatment process according to the recent proposal may include additional steps of collecting, discharging and treating any precipitates and/or gases generated by the reactions between the treatment solution and the liquids being treated. According to the present invention, however, there should be very little or no precipitates, scaling and/or gases generated by the treatment process.

The most appropriate or optimum dosage amount of the recently proposed treatment solution within the discussed range will vary, with generally linear scalability, based on a few factors. These factors include: specific content of the liquid being treated including the amount of $H_2S$ and other contaminants contained therein, the viscosity of the liquid being treated, whether the treated liquid is being agitated and/or heated, and the amount of time permitted for reacting the treatment solution and the petroleum based liquid. Such treatment solution according to the recent proposal may further include one or more other components depending on the specific characteristics of the liquids being treated, and other factors relating to the remediation treatment process. Characteristics of the liquids include the viscosity thereof, the particular contaminants therein along with $H_2S$, and the amounts of each of $H_2S$ and the other contaminants contained in the liquids. While $H_2S$ is the main contaminant which must typically be remediated in the liquids being treated, such as crude oil, it may be necessary or desirable to also remediate the other contaminants besides $H_2S$ in the liquids, and the other contaminants may also create complications for remediating the $H_2S$. For example, if crude oil is the liquid being treated and contains an appreciable amount of carbon dioxide ($CO_2$), this may affect the treatment process because hydroxide(s) contained in the recently proposed treatment solution may react with carbon dioxide in the presence of trace amounts of water according to the following equation (3), whereby it may be necessary to use an additional amount of hydroxide(s) for treating the crude oil, e.g., by increasing the dosage amount of the recently proposed treatment solution added to the crude oil.

$$CO_2 + NaOH(aqueous) \rightarrow NaHCO_3 \quad (3)$$

Other important factors pertaining to the treatment process for remediating contaminants in the liquids include permitted reaction time, whether the treated liquid is being agitated and/or heated, and the type of remediation desired. If liquids that are being treated are highly viscous, heating and/or mixing may be desirable or necessary to disperse the recently proposed treatment solution throughout the treated liquid within a reasonably short time such as 1-3 hours. Mixing at moderate to high speeds may reduce required reaction time by 50% or more. In terms of the type of remediation desired, it is important to know whether there are any restrictions on the amounts of precipitate(s) and/or gases that may be released from the treated liquids, whether it is desired to generate a certain precipitate or gas via the treatment, etc., as different amounts of the recently proposed treatment solution that are used per given unit of the liquid being treated will achieve different results, as discussed herein.

Generally, if the liquid being treated is a medium to light crude oil and the amount of $H_2S$ is relatively low, e.g. 20 ppm-100 ppm the most appropriate dosage rate may be toward the lower end of the standard range, whereas if the amount of $H_2S$ is relatively high, e.g. 20,000 ppm-40,000 ppm the most appropriate dosage rate may be toward the higher end of the standard range, and most appropriate dosage rates for intermediate amounts of $H_2S$ would be at correspondingly intermediate values of the standard range. The recently proposed treatment process may be conveniently carried out essentially wherever the contaminated liquids may be present, e.g., in open bodies of the liquids, in conjunction with a transport tanker or other vessel in which the liquids are being transported, at a wellhead where the liquids are being extracted from the ground, in open or closed tanks, in an enclosed pipeline through which the contaminated water or other liquid is being transported, etc.

Similarly, as the viscosity of a hydrocarbon based liquid being treated increases, or the API gravity of the liquid decreases, the most appropriate amount of the treatment solution to be used in a treatment process according to the inventors' recent proposal will generally increase. The treatment solution, including hydroxide(s), has good migration characteristics when added to thin, low viscosity hydrocarbon based liquids with an API gravity of 33° or more and can readily disperse throughout the liquids, although the liquids could be heated and/or mixed to increase the rate and/or uniformity of dispersion, which will reduce required reaction time for remediating $H_2S$. For medium viscosity hydrocarbon based liquids with an API gravity of about 23°-33°, mixing by stirring at low-moderate speeds, e.g., 100-500 rpm or other appropriate manner, and/or heating to temperatures below the flash point of the liquids is helpful to disperse the treatment solution in the liquids. For highly viscous hydrocarbon based liquids with an API viscosity of 15° or less, heating to temperatures below the flash point of the liquids together with mixing is generally required to properly disperse the treatment solution in the liquids. Different types of hydrocarbon liquids include light crude oil (API gravity ≥31.1°), medium crude oil (API gravity between 23.3° and 31.1°), heavy crude oil (API gravity <23.3°), bunker fuel (API gravity approximately 6°), diesel fuel (API gravity approximately 34°), etc. Hydrocarbon based liquids with an API gravity of less than 10° are heavier than water, are extremely viscous and will sink in water. In terms of the dosage rates for the treatment solution, if the hydrocarbon based liquid contains 2,000 ppm or less of $H_2S$, for low viscosity (API gravity of 33° or more) hydrocarbon based liquids such as diesel fuel, a most appropriate dosage amount may be 1-2 ml/liter of based liquid, while for medium viscous liquids (API gravity of 20°-30°) such as light, medium or heavy crude oil, a most appropriate dosage amount may be 2-3.5 ml/liter of the hydrocarbon based liquid, and for highly viscous petroleum based liquids (API gravity of 15° or less), such as bunker fuel, a most appropriate dosage amount may be 5-6 ml/liter of the hydrocarbon based liquid. For contaminated aqueous solutions, viscosity is typically not a significant factor for determining the most appropriate treatment dosage of the recently proposed treatment solution because the viscosity of contaminated aqueous solutions is typically low and the treatment solution readily disperses—migrates throughout the liquid, even without mixing or heating.

As far as reaction time permitted, there may no restriction thereon and the treatment solution may be permitted to react for any suitable time such as 15 minutes-24 hours at a most appropriate dosage rate based on the concentration—amount of $H_2S$ contained in the particular liquid and the viscosity (API gravity) of the liquid in a treatment process according to the inventors' recent proposal. However, there may be situations where reaction time is limited, e.g., limited to an amount of time required to transport the hydrocarbon based liquid to a desired destination for unloading after the treatment solution has been added to the liquid, limited to less than 30 minutes based on desired productivity, etc. In such situations with limited reaction times, a most appropriate dosage amount of the treatment solution to be added to the liquid according to the inventors' recently proposed treatment process may be increased above the standard dosage amount as determined based on based on the concentration—amount of $H_2S$ contained in the particular liquid and the viscosity (API gravity) of the liquid, e.g., increased to an amount that will assure essentially complete remediation of the $H_2S$ contained in the particular liquid within the time permitted. For example, if a normal reaction time required to fully remediate $H_2S$ contained in the particular liquid is 2 hours, but the permitted reaction time is only 1 hour, a most appropriate dosage amount may be twice that of a standard dosage amount determined based on the concentration—amount of $H_2S$ contained in the particular liquid and the viscosity of the liquid.

According to one study performed by the present inventors, when a crude oil containing about 1000 ppm $H_2S$ was treated with a treatment solution according to the inventors' recent proposal which contained NaOH as approximately 99% of the total hydroxides therein, KOH as the other 1% of hydroxides therein and total hydroxide concentration of approximately 50 wt % in the solution, when 0.25 ml of the treatment solution was added/liter of the crude oil it took approximately 12 hours to remediate or abate the $H_2S$ down to approximately 0 ppm, whereas when 5 ml of the treatment solution was added/liter of the crude oil it took approximately 30 minutes to abate the $H_2S$ down to approximately 0 ppm. In a similar study performed by the inventors, essentially the same results were obtained with a treatment solution according to the inventors' recent proposal containing KOH as approximately 99% of the total hydroxides therein, NaOH as the other 1% of hydroxides therein and total hydroxide concentration of approximately 50 wt % in the solution was used in the same quantities to treat the same crude oil.

A complicating factor in treating hydrocarbon based liquids such as crude oil to remediate the $H_2S$ and other contaminants therein is the fact that the naturally occurring crude oil and natural gas, as well as aqueous solutions extracted from the earth along with crude oil and natural gas, extracted at any given place and time always have unique characteristics that must be considered. For example, even in relation to one given oil well or natural gas well, the crude oil, natural gas and aqueous solutions extracted therefrom have characteristics which can vary greatly, e.g., crude oil extracted from a given well at a given time on a given day, can contain amounts of $H_2S$, as well as various types and amounts of other contaminants, which are significantly different from those contained in crude oil extracted from the same well on the same day, but at a different time. The treatment solutions and treatment processes according to the inventors' recent proposal are suitable for remediating the $H_2S$, as well as various other types and amounts of other contaminants, in any of such liquids.

According to an advantageous aspect of the recently proposed treatment solution and treatment process, a given or standard blend of the treatment solution may be used for treating a wide variety of different liquids, whether hydrocarbon or water based, and for treating such liquids which contain different amounts of $H_2S$ and other contaminants. For example, addition of a moderately excessive amount of the treatment solution above the standard dosage range will generally assure that the $H_2S$ and other contaminants will be remediated down to acceptable levels, but will not detrimentally affect the treated liquid to any significant extent.

Thus, for example, it may be advantageous and/or convenient to add 1.5 times a standard dosage amount of a standard blend the treatment solution to a given liquid to ensure that the $H_2S$ and other contaminants in the liquid will be sufficiently remediated down to acceptable levels, rather than carefully analyzing the given liquid and determining a most appropriate dosage of the treatment solution based on the analysis. While the cost of the treatment may be increased because additional treatment solution is being used, the additional cost may be acceptable in some situations. On the other hand, if the dosage amount of the treatment solution is 2-5 times the standard dosage amount, this may cause additional results such as formation and release of various precipitates and other contaminants, and if the dosage amount of the treatment solution is 10 times the standard dosage amount this may cause the treated liquid to become caustic as discussed herein.

It is conventionally understood that an aqueous solution of hydroxide such as NaOH will react with $H_2S$ in petroleum based liquids such as crude oil. Generally, $H_2S$ is an acidic compound, crude oil as extracted from the ground and containing a typical amount of $H_2S$, e.g. ≤2000 ppm, which is mostly in the form gas dissolved in the crude oil, has a moderately acidic pH of about 5-5.5. Gaseous $H_2S$ does not exist in solution above a pH of about 7. A treatment solution according to the present inventors' recent proposal contains a large percentage of hydroxide(s), is basic with a pH of about 13-14, and when added to the petroleum liquid increases the pH thereof. The water and hydroxide(s) in the treatment solution are used to extract $H_2S$ from the crude oil into the water, thereby dissociating $H_2S$ to HS— ion at higher pH, which shifts the equilibrium of $H_2S$ gas from oil to water. Then, the HS— can react with sodium to form NaHS (sodium bisulfide), or with $S_2$— to form $Na_2S$ (sodium sulfide), for example, plus water as a byproduct according to the equations (1), (2) discussed herein.

The present inventors recent proposal is based on their discovery that the conventional treatment methods, using a caustic aqueous solution consisting of up to 20 weight percent sodium hydroxide (NaOH) in water are not efficient, and that the $H_2S$ can be much more efficiently remediated using a more highly concentrated, aqueous hydroxide solution; e.g., including as a primary component 35-55 weight percent, and preferably at least 45 weight percent, of one or more hydroxides, such as sodium hydroxide (NaOH) and potassium hydroxide (KOH). Based on the inventors' investigations they determined that:

1) the liquid-liquid extraction aspect of the conventional methods is actually not that important in comparison to the chemical reaction aspect, e.g., because the initial solubility of $H_2S$ into water, as given by Henry's Law, is low;

2) the larger amounts of water used in aqueous treatment solutions according to the conventional methods also function to dilute the NaOH, which is undesirable because this significantly slows the process needed to produce ionized HS— and $S_2$— ions that allow more of the $H_2S$ contained in the petroleum liquids to go into the water, and 3) it is much more efficient and effective to remove the sulfur-containing compounds primarily though a chemical reaction process and to a much lesser degree a liquid-liquid extraction though use of a the aqueous treatment solution containing a very high concentration of hydroxide(s), provided that the amount of caustic (hydroxide) used is carefully limited within a controlled range, which accounts for factors including stoichiometry of intended reactions and desired rate of reaction.

Although there are many different common compounds of hydroxide ($OH^-$) that may be used in the treatment solution according to the recent proposal, many of these have undesirable characteristics associated therewith, including that they would introduce other contaminants into the treated liquids which may require further remediation step(s), high cost, etc. For example, iron, other metals, calcium, barium, and chlorides interfere with heat and cracking in refining processes and would have to be removed from treated crude oil before it is refined. On the other hand sodium, potassium, magnesium, and manganese, are permitted in refining processes as long as the content is not too high, e.g., <250 ppm, so that hydroxides of these elements would be appropriate if the treatment solution is being used for treating crude oil.

Sodium hydroxide is very effective for use in the recently proposed treatment solution because it does not harm the hydrocarbon based liquids when used in appropriate amounts. For example, if NaOH is used exclusively or primarily as the hydroxide in the treatment solution at a concentration of about 50 weight percent, and the solution is used at a standard dosing rate to treat crude oil in a treatment process according to the inventors' recent proposal, this may increase sodium content in the treated crude oil from about 10 ppm to about 50 ppm. At such content level the sodium does not detrimentally affect the crude oil to any appreciable extent. Further, the recently proposed treatment solution does not introduce any other contaminants into the crude oil that would require further remediation step(s), and the treatment solution is relatively inexpensive. Potassium hydroxide (KOH), magnesium hydroxide ($Mg(OH)_2$), and manganese hydroxide ($Mn(OH)_2$, $Mn(OH)_4$) are some other suitable hydroxides for use in the recently proposed treatment solution.

Use of a combination of hydroxides is advantageous for more completely reacting with and remediating most or all of the sulfides in the hydrocarbon based liquids and contaminated aqueous solutions, noting that there are more than 300 types of sulfides and NaOH is not the most suitable hydroxide for treating each of the different sulfides. Of course, hydrogen sulfide $H_2S$ is by far the main contaminant that must be remediated. Potassium hydroxide (KOH), for example, is more effective than sodium hydroxide for reacting with some species of sulfides. Hence, if the treatment solution according to the inventors' recent proposal contains some amount of potassium hydroxide (KOH) together with the sodium hydroxide, the treatment solution achieves a more complete reaction with all of the sulfur contained in the petroleum based liquids in comparison to just using a treatment solution of sodium hydroxide. For example, the treatment solution according to the recent proposal may contain a blend of 50-99.9 parts NaOH: 0.1-50 parts KOH, at a total hydroxide concentration of 35-55 weight percent in the treatment solution, and preferably at least 45 weight percent in the treatment solution. Again, such treatment solution according to the recent proposal is highly alkaline with a pH of 13-14.

Also, aqueous solutions of different hydroxides will freeze at different temperatures, even if the solutions have the same collective concentrations of the different hydroxides, and this may be an important consideration. For example, if the treatment process is to be conducted at an ambient temperatures near, at or below 0° C., it may be desirable to use a treatment solution containing a collective high concentration of 35-55 weight percent, and preferably at least 45 weight percent, of one or more hydroxide(s) wherein the treatment solution has a freezing temperature below the ambient temperature so as to avoid any temperature-related complications such as freezing or gelling of the treatment solution and/or the treated liquid, e.g., a treatment solution containing KOH as the primary hydroxide has a freezing temperature lower than that of a treatment solution containing NaOH as the primary hydroxide by at least 10° C.

The recently proposed treatment process provides unexpectedly good results for efficiently remediating the $H_2S$, other sulfur based contaminants and other contaminants in both hydrocarbon based liquids and aqueous solutions. For example, according to conventional understanding at the time of the inventors' recent proposal it was counterintuitive to limit the amount of water in the remediation process when applied to hydrocarbon based liquids such as crude oil because this limits chemical contact with the contaminants in the hydrocarbon based liquids, e.g., the chemical reactants are mostly ionic and readily dissolve in water, but not in the petroleum based liquids such as crude oil. However, the present inventors have discovered that since the chemical reactions involved between hydroxides and sulfur based contaminants including $H_2S$, e.g., equations (1), (2) above, produce water, the produced water can readily diffuse through the hydrocarbon based liquid being treated as it is produced because the caustic solution has good migration tendencies in many hydrocarbon based liquids and the diffusion may also be enhanced by agitation and/or heating of the treated liquids. Correspondingly, the inventors also found that it is unnecessary to add any significant amount of water in the treatment process apart from the water in the treatment solution in order for the hydrocarbon based liquid to be effectively treated for remediation of sulfur-containing contaminants, including $H_2S$, and other contaminants therein. An exemplary treatment process according to the inventors' recent proposal as discussed herein is not a wash type process, but rapid chemical reactions that greatly reduce the mass transfer of the gas to aqueous phase.

What the treatment process according to the recent proposal does differently, in comparison to the conventional treatment processes for remediating hydrocarbon based liquids, is to essentially reduce the initial amount of water to the minimum effective amount, while carefully limiting the amount of hydroxides and possibly other reactants in the treatment solution to appropriate amounts, for reacting with the contaminants in the hydrocarbon based liquid being treated based on considerations of stoichiometry, desired reaction rate and specific result desired, and by this the efficiency of the process is increased in multiple aspects in comparison to conventional treatment processes known at the time of the inventors' recent proposal. One aspect is that excessive amounts of the treatment solution are not used and wasted. Another aspect of increased efficiency is that more of the hydrocarbon based liquid may be treated for any given size treatment batch/tank because there is less amount of water in the batch/tank. As another example, the volume of resulting waste that must be removed and possibly treated is reduced as well. Further, as a main component of the treatment solution, highly concentrated aqueous solutions of hydroxides are commercially available in appropriately high concentrations for direct use in the treatment solution, e.g., concentrated aqueous solutions of NaOH are available in concentrations of 47 weight percent NaOH (17.6 M) and 50.5 weight percent NaOH (19.4 M), which may be directly used in the exemplary embodiment of the present invention because no efforts need be made to dilute the commercially available NaOH solutions to a lesser concentration with water.

The present inventors have found that it the reactions involved in the treatment process according to their recent proposal are properly controlled by dosing the treatment solution within the standard range of 0.25-6 ml/liter of hydrocarbon based liquid, preferably within a range of 1.0-5.0 ml/liter of the petroleum based liquid, and a reaction time such as 15 minutes to 24 hours according to the recent proposal, then the hydroxides in the treatment solution will react with the sulfur preferentially over other species in the hydrocarbon based liquids such as crude oil and will not harm the hydrocarbon based liquids. For example, the present inventors have found that a dose of the treatment solution according to the recent proposal within the standard range does not harm the hydrocarbon based liquids and completely remediates the $H_2S$ contained therein down to 5 ppm or less, and typically down to substantially 0 ppm. Any residual caustic substances, including hydroxide(s), resulting from the treatment process according to the recent proposal will typically not harm the hydrocarbon based liquids because it will be a relatively small residual amount. Also, residual hydroxides tend to be contained in an aqueous portion of the hydrocarbon based liquids, i.e., a portion containing the water from the treatment solution and water produced in reactions between the hydroxides in the treatment solution and the sulfur containing compounds in the hydrocarbon based liquids and may be readily separated from the hydrocarbon based liquids.

When the treatment solution according to the inventors' recent proposal contains sodium hydroxide (NaOH) as the primary hydroxide contained therein, e.g., at least 90% of the hydroxides, much of the $H_2S$, e.g., at least 60% is converted into sodium bisulfide (NaHS) according to the reaction (1) above, which remains dissolved in the treated petroleum liquid, and does not create any significant problems that would need to be addressed, e.g., this would not prevent the crude oil from being accepted as sweet, high grade crude oil. Additionally, some of the $H_2S$ may be converted into sulfur dioxide ($SO_2$) gas, e.g., upon stirring which allows air containing oxygen to get into the oil, which may be released from the treated petroleum based liquid, depending on the pressure under which the treated liquid is kept. Generally, hydroxides including NaOH are reducing agents and would not produce sulfur dioxide or elemental sulfur if the treated hydrocarbon based liquid is not exposed to air. However, if the oil is exposed to air, the sulfide/bisulfide can be oxidized to $SO_2$ or to elemental sulfur. All sulfide species are the same oxidation state (−2) and NaOH is not changing the oxidation state. Similar reactions would occur for other hydroxides included in the treatment solution. Relative to any such sulfur dioxide ($SO_2$) gas, as well as any other gases that may be released from the treated crude oil, it would be necessary as a safety measure to provide some head space in a closed tank or other closed vessel transporting the treated liquid to assure that the pressure does not get excessively high.

Although the treatment process according to the inventors' recent proposal will increase the content of sodium (Na) in the treated liquid when the treatment solution contains sodium hydroxide as the primary hydroxide contained therein, this does not cause any problems or detrimental effects when the crude oil is refined and subsequently combusted. For example, a study performed showed that for crude oil with a starting concentration of about 8 ppm Na and about 1000 ppm $H_2S$, after treatment using 3 ml of the treatment solution according to the inventors' recent proposal/liter of the crude oil, the final concentrations were about 40 ppm Na and 0 ppm $H_2S$. Sodium has no adverse effects in the crude oil refining process as long as the concentration of sodium is generally ≤250 ppm.

Moreover, the abatement of the $H_2S$ by the treatment process according to the inventors' recent proposal is desirably non-reversible, unlike $H_2S$ abatement achieved by a conventional amine treatment process which uses an amine such as MEA or triazine for treating $H_2S$ in crude oil. For example, with the conventional amine treatment process, while the $H_2S$ may be initially remediated or abated down to acceptable levels, the sulfur contained in the treated oil may undesirably revert back to $H_2S$ over time, especially if the treated oil is heated. Conversely, when crude oil which initially contained about 1000 ppm $H_2S$ was treated according to a treatment process using the treatment solution according to the inventors' recent proposal at a dosing rate of 3 ml/liter of oil and the $H_2S$ was abated down to about 0 ppm and essentially, none of the sulfur precipitated out of the oil, the treated crude oil was heated up to 180-300° F. or 82.2-148.9° C. for periods of hours, days and weeks, the resulting oil still contained about 0 ppm $H_2S$. Essentially none of the sulfur compounds(s) in the treated liquid reverted back to $H_2S$.

The recently proposed treatment process involving addition of the treatment solution at the appropriate dosage rate within the standard dosage range discussed above will raise the pH of the treated liquid, e.g., crude oil pumped directly from the ground having a pH of about 5.0-5.5 will increase to a pH of about 5.8-6.2, which changes the valence of the dissolved $H_2S$ gas in the liquid and permits substantially all of the $H_2S$ to be abated and remediated into other compounds which are not toxic.

At a dosage rate of less than 0.25 ml of the treatment solution according to the inventors' recent proposal/liter of the contaminated liquid being treated, the hydroxide(s) in the treatment solution may not efficiently react with $H_2S$ and other sulfur containing compounds in the hydrocarbon based liquids, the contaminants may not be completely abated, and the treated liquids may not meet government-established limits for $H_2S$ and other contaminants, even if there is no time limit for the treatment solution to react with the liquid being treated. On the other hand, if the added amount of the treatment solution according to the inventors' recent proposal/liter of treated liquid is more than 6.0 ml, the additional amount of the treatment solution may not improve the efficiency of remediating the $H_2S$ and other sulfur containing compounds in the treated liquids per se, and may simply increase the cost of the treatment process. However, addition of an excessive amount of the treatment solution according to the inventors' recent proposal above the standard dosage rate may be desirable for various reasons, such as those discussed in PCT/US2018/050913.

Especially in terms of amounts of contaminants remediated, and perhaps in terms of the time required for the treatment, there is generally no significant improvement in the remediation of $H_2S$ in the treated liquid using more than 6.0 ml of the treatment solution according to the inventors' recent proposal/liter of the treated liquid in comparison to treatment involving more than 6.0 ml of the treatment solution/liter of the same liquid. For hydrocarbon based liquids, however, unless the dosage rate is greatly exceeded, e.g., by more than 5 times the standard dosage rate for a particular hydrocarbon based liquid being treated, it is unlikely that the excess/residual amount of the caustic treatment solution will harm the hydrocarbon based liquid or any metallic container in which the hydrocarbon based liquid is contained to any appreciable extent. At more than 10 times the standard dosage rate for the particular hydrocarbon based liquid, the treated liquid is likely to be caustic and have a relatively high pH, which can be undesirable because it may corrode metals including steel and aluminum. Thus, it may be important to properly dose the amount of treatment solution used in the treatment processes according to the inventors' recent proposal in order to be most efficient and cost effective, and in order to achieve specifically desired results. Desirably, however, even if the dosage amount used in a treatment process according to the recent proposal is moderately or significantly excessive in comparison the optimum dosage amount within the standard dosage range based on stoichiometry and other considerations, this should not create any significant problems for the treated liquids.

The recently proposed treatment solution may include other components, again, depending on the presence of other contaminants in the hydrocarbon based liquids and contaminated aqueous solutions which are to be remediated, as well as on the desired results of the treatment process. These other components may also be included in the treatment solution and treatment process according to the present invention. For example, a small amount of a silicate such as potassium silicate may be added to such treatment solution to provide an anti bacterial function, which may be desirable for killing microbes, including sulfur eating microbes. For example, 2-10 ml of a potassium silicate aqueous solution containing 29-45 weight percent potassium silicate in water may be added per liter of the recently proposed aqueous treatment solution containing a total hydroxide concentration of 35-55 weight percent therein, and then the treatment solution containing hydroxide(s) and potassium silicate may be added to the liquid being treated at appropriate dosage rates within the discussed standard dosage range. Potassium silicate comes in various ratios of $SiO_2:K_2O$, but is often represented as $K_2SiO_3$.

Other appropriate anti-bacterial agent or agents could be used in addition to or as an alternative to silicates, depending on the particular liquid being treated. For example, barium (Ba) may be added in an amount of ≤100 ppm of the liquid being treated, whether a hydrocarbon based liquid or aqueous solution, and will provide an antibacterial function. Barium tends to be more appropriate for use with lighter hydrocarbon based liquids including diesel fuel and for treating contaminated aqueous solutions, while potassium silicate tends to be more appropriate for use with heavier hydrocarbon based liquids including crude oil. Also, barium is prohibited in hydrocarbon based liquids which are to be refined because barium has an adverse effect on the refining process. Therefore, barium is not preferred in the practice of the present invention when hydrocarbon based liquids such as crude oil are being treated.

Another component which may be included in the inventors' recently proposed treatment solution, which is then added to a contaminated aqueous solution in a treatment process according to the recent proposal, is sodium bisulfite ($NaHSO_3$). When added at a relatively low concentration, e.g., 0.001-0.05 ppm/liter of liquid being treated, sodium bisulfite is very effective for displacing dissolved gases such as methane ($CH_4$) contained in contaminated aqueous solutions as these liquids are treated and transported via a tanker truck, pipeline or other manner, so that the displaced gas may be captured, collected and sold. This is, of course, very desirable and advantageous. Thus, for example, if contaminated wastewater produced or obtained when extracting methane—natural gas from a well contains 5% volume of methane—natural gas dissolved therein, this can represent a significant amount of methane—natural gas that may be recovered, and favorably increases the total production of the well. An aqueous solution of sodium bisulfite may be highly concentrated, e.g., 70-90% wt/wt, may be added to the recently proposed treatment solution at an appropriate rate to achieve a concentration of 0.001-0.05 ppm/liter of liquid being treated. While addition of sodium bisulfite may be particularly suitable for treating aqueous solutions, it may also be added to a treatment solution used for treating hydrocarbon based liquids. Significantly, however, if sodium bisulfite is to be used in treating crude oil or other hydrocarbon based liquids it should be added in hydrated form, whether in power or liquid, to function efficiently.

Additionally, hydrocarbon based liquids such as crude oil and contaminated aqueous solutions tend to have various impurities and various amounts of impurities, many of which must or should be remediated along with the $H_2S$ and other sulfur containing contaminants. These impurities include ammonia ($NH_3$), which tends to accumulate in the water produced via the reactions (1), (2), carbon dioxide gas ($CO_2$), as well as various solid impurities including dead—decomposing organic matter, total suspended solids (TSS) or "rag" which typically include various minerals and other inorganic matters which bond to the hydrocarbons, bottom sediment and water (BSW), heavy metals, etc. The accumulated ammonia may be discharged as a gas from the liquid being treated, which is toxic and undesirable. Carbon dioxide reacts with hydroxide(s) such as NaOH in the treatment solution as discussed above in relation to equation (3).

For remediating ammonia the pH of the aqueous portion of the liquids in the treatment cell may be adjusted to a level such as 8.5-7.0, at which the ammonia is converted to ammonium ion ($NH_4+$) and thereby prevents the ammonia from being released in gas form. However, reducing the pH of the treatment solution may also affect the reactions between hydroxide and $H_2S$. At lower pH, such as 7.0-8.5, $S^{2-}$ ions in the liquid are converted to $HS^-$ ions, which is one step closer to $H_2S$, so that there will be more residual $H_2S$ in the liquid when the pH is adjusted lower and less residual $H_2S$ in the liquid when the pH is adjusted higher. Hence, there may be some consideration of optimization of pH so as to achieve a desired balance between mitigation of $H_2S$ on the one hand versus mitigation of $NH_3$ on the other hand. Appropriate dosing of the recently treatment solution in the recently proposed treatment process should produce a pH of around 7-10 in a hydrocarbon based liquid being treated, whereas if ammonia is a concern, the pH should not be raised above 8.5. Thus, there is some overlap in the appropriate pH ranges for remediating both $H_2S$ and $NH_3$, and depending on which of these contaminants is present and at what levels the pH can be suitably adjusted to achieve an optimum result. Of course, remediation of $H_2S$ is a primary focus of the invention, and would normally be a primary factor in determining the appropriate pH for the treated liquid. It should also be noted that overdosing with the recently proposed treatment solution may increase the pH above 9, and thus increases the risk of producing more ammonia gas. Hence, this is another reason why the dosage rate for the recently proposed treatment solution should be maintained within a standard range as discussed herein. An alternative approach for remediating ammonia in the liquids being treated is to remove the ammonia from the aqueous portion of the liquid via an ion exchange process.

In regards to the rag impurities in the liquids being treated, these may be conveniently and efficiently removed from the liquids using the same treatment solution and treatment processes according to the inventors' recent proposal as used for reacting with the $H_2S$ and other sulfur-containing compounds in the liquids. As discussed in PCT/US2018/050913, however, this may involve a higher dosage rate of the recently proposed treatment solution as compared to the standard dosage rate for remediating $H_2S$ and other sulfide compounds and/or adding other substances which will cause formation of precipitates or the like, e.g., components such as ferric chloride ($FeCl_3$) and/or ionic polymers. For example, adding 2-5 times the standard dosing rate of the recently proposed treatment solution to the hydrocarbon based liquid will generally cause remediated sulfur containing compounds, rag impurities, and other remaining impurities remaining in the treated hydrocarbon based liquid to precipitate out of the liquid if so desired, while addition of ferric chloride ($FeCl_3$) and/or ionic polymers to the treated liquid may cause flocculation which traps—bonds the contaminants and causes them to precipitate out of the treated liquids. Of course, formation of precipitates would be contrary to one of the objects of the present invention, which functions to maintain the remediated sulfur containing compounds and other contaminants in the treated liquid for some period of time without formation of precipitates, scaling or the like.

Similarly, an exemplary treatment process according to the inventors' recent proposal may include additional steps of collecting, discharging and treating any precipitates and/or gases generated by the reactions between the treatment solution and the hydrocarbon based liquids. Again, however, an important aspect of a treatment process using a modified treatment solution according to the present invention is that substantially no precipitates, scaling or the like will be generated by the remediated liquids while the liquids are being treated, transported and stored for a predetermined period of time such as 30 minutes—one or more days. Hence, a treatment process according to the present invention should normally not require any steps of collecting, discharging and treating any precipitates released from the treated liquids because there should be no such precipitate(s), scaling or the like generated.

(II) The Treatment Solution and Treatment Process According to the Present Invention Again, the treatment process according to the present invention will include use of a dosage of the treatment solution according to the recent proposal within the discussed standard range for efficiently remediating $H_2S$ and other contaminants in the liquids down to safe, acceptable levels in essentially the same manner as discussed in PCT/US2018/050913, but further involves use of additional substance(s) to assure that no precipitate(s), scaling and the like are generated and released from the treated liquids while the liquids are being treated, transported and stored for time periods of hours, days and weeks, and without causing any significant problems for the treated liquid. The treatment process involving addition of the recently proposed treatment solution within the standard dosage range to a contaminated liquid may typically generate little or no precipitate(s), scaling and the like, but to assure such result the treatment process according to the present invention include use of one or more additional substances along with a dose of the recently proposed treatment solution within the standard dosage range.

The additional substance(s) to be used together with the recently proposed treatment solution according to the exemplary embodiment of the present invention may primarily include one or more organic acids, such as fulvic acid and humic acid. In the treatment process according to the present invention, the organic acid(s) may be added to the liquid being treated in an appropriate collective amount that will result in a normal concentration of 0.01-10 ppm, and preferably 0.1-3.0 ppm, in the liquid, whether the treated liquid is a hydrocarbon based liquid or contaminated aqueous solution. Within such range, the most appropriate dosage rate of the organic acid(s), like the most appropriate dosage rate of the recently proposed treatment solution, largely depends on the same three factors discussed in relation to determination of the most appropriate dosage amount of inventors' recently proposed treatment solution, i.e., 1) the amount of $H_2S$ and other sulfur containing contaminants in the liquid being treated; 2) the viscosity of the liquid; and 3) the amount of time permitted for reacting the treatment solution with the liquid being treated, although heating and/or mixing of the liquid being treated will reduce the viscosity of the liquid and will also reduce the amount of time required for properly remediating the $H_2S$ and other sulfur compounds which are not toxic or highly dangerous, unlike the $H_2S$ before the remediation.

Fulvic acid is actually a family of organic acids, but may typically be identified as 1H,3H-Pyrano[4,3-b][1]benzopyran-9-carboxylic acid, 4,10-dihydro-3,7,8-trihydroxy-3-methyl-10-oxo-; 3,7,8-trihydroxy-3-methyl-10-oxo-1,4-dihydropyrano[4,3-b]chromene-9-carboxylic acid, with an average chemical formula of $C_{135}H_{182}O_{95}N_5S_2$ and molecular weights typically in a range of 100 to 10,000 g/mol. Somewhat similarly, humic acid is a mixture of several molecules, some of which are based on a motif of aromatic nuclei with phenolic and carboxylic substituents, linked together, and the illustration below shows a typical structure. Molecular weight (size) of humic acid is typically much larger than that of fulvic acid, and can vary from 50,000 to more than 500,000 g/mol.

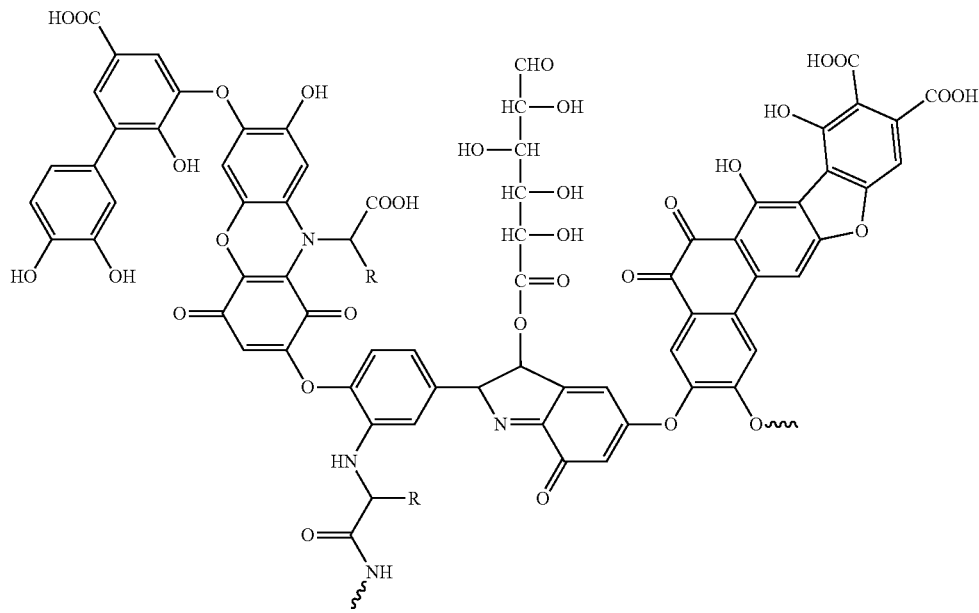

contaminants in the liquid. The dosage amount of organic acid(s) is substantially, linearly scalable within the discussed range based on these factors.

The organic acid(s) used according to the present invention react and/or bond with the sulfur containing compounds, including those exposed and remediated by reacting with NaOH or other hydroxide(s) in the recently proposed treatment solution, and are essentially all maintained in the treated liquid, rather than being discharged therefrom as gasses, precipitate(s), scale or the like. It is possible that a small amount of the remediated sulfide compounds may be released from the treated liquids as a gas such as sulfur dioxide or as a precipitate such as a sulfate when the organic acid(s) are added at the discussed normal concentrations, but the small amount is generally not significant. Further, if it is desired that no amount of precipitate(s), gas(ses), scale and the like be generated from the treated liquid, the amount of organic acid(s) added in the treatment process may be increased above the discussed concentration, e.g., increased by 10-50%. Very importantly, the treated liquids are not detrimentally affected by the treatment process to any significant extent, e.g., the remediated sulfide compounds mostly remain in the treated liquids, but in the form of other The organic acid(s) can be added to the treatment solution according to the present invention in powder form, e.g., a powder containing 70-100 wt % of the organic acid(s), or in an aqueous solution, e.g., an aqueous solution containing 1-40% volume of the organic acid(s).

Another substance which may be used in the treatment processes according to the present invention is monoethanolamine or MEA ($C_2H_7NO$). MEA is a liquid organic compound and a weak base. MEA functions as a descaler and is also more effective at remediating some species of sulfur compounds than are the hydroxide(s) in the recently proposed treatment solution so that the treatment process according to an exemplary embodiment of the present invention achieves a more complete remediation of various species of sulfur containing compounds. An appropriate amount of the MEA to be used in the treatment process will typically correspond to a concentration of 0.5-15 ppm, and preferably 1.0-10 ppm, of the MEA in the hydrocarbon based liquid or aqueous solution being treated. Within such range, the most appropriate dosage rate of MEA, again, largely depends on the same factors as discussed in relation to the organic acid(s) and the recently proposed treatment solution, and the dosage amount of MEA is substantially, linearly scalable within the discussed range based on these factors. MEA may be used in the treatment process according to the present invention directly at 100% concentration.

In the treatment process of the present invention, there are some additional considerations relating to MEA. For one, MEA exothermically reacts with hydroxides such as NaOH also used in the treatment process, so that it is desirable not to include an excessive amount of MEA in the treatment process as doing so may become counter productive to the intended function of the hydroxides for reacting with $H_2S$ to remediate same. MEA also can react with carbon dioxide ($CO_2$) according to the following reversible reaction

(4)

To any extent that MEA reacts with carbon dioxide in a treated liquid, this may reduce the amount of undesired reactions involving the hydroxide(s) also being used in the treatment process, i.e., reactions between the MEA and the hydroxide(s) and reactions between carbon dioxide and the hydroxide(s) according to equation (3) above. The amount of carbon dioxide in the liquid being treated may also be an important factor if the amount is significant, and it may be desirable to increase the dosage amount of MEA based on the content of carbon dioxide in the treated liquid in for liquids containing a relatively high amount of carbon dioxide.

Another optional component which may be included in the treatment solution and treatment process of the present invention is a an anti-freezing or anti-gelling agent, which may be desirable when treating hydrocarbon based liquids such as crude oil, particularly at cold temperatures 0° C. and below, because other component(s) used in the treatment solution and treatment process according to embodiments of the present invention may cause freezing or gelling in the treated hydrocarbon based liquids at such temperatures. For example, the water in the treatment solution according to the inventors' recent proposal in PCT/US2018/050913, the water which is generated by the reactions between the hydroxide(s) and $H_2S$ and other contaminants in the treated liquids, and the organic acids may cause gelling in treated crude oil. Although the treated crude oil could be heated to prevent such gelling, it is not always possible or practical to heat the treated crude oil. In such situations addition of an anti-gelling agent may be the most appropriate manner of preventing gelling of the crude oil. One appropriate group of anti-gelling agents is low molecular weight hydrocarbon liquids including hexane and cyclo hexane, which may be added to the hydrocarbon based liquids being treated at a dosage rate of 10% volume-25% volume of the collective total volume of all other components being added to the hydrocarbon based liquids being treated according to the treatment process of the present invention. Thus, for example, in a treatment process according to the present invention, if a large volume of crude oil is being treated using 85 gallons of the treatment solution according to the inventors' recent proposal in PCT/US2018/050913, together with 10 gallons of organic acid(s) and 5 gallons of MEA, for a total volume of the other components equal to 100 gallons, 10-25 gallons of hexane or cyclo hexane may also be added to the crude oil as an anti-gelling agent as part of the treatment process.

An alternative for preventing freezing or gelling of hydrocarbon based liquids in the treatment process of the present invention, and as discussed above, is to select the hydroxide(s) used in the treatment solution according to the inventors' recent proposal such that that treatment solution will have a freezing temperature below the ambient temperature at which the treatment process is being conducted. For example, in a treatment process treating crude oil if the recently proposed treatment solution contains approximately equal amounts of NaOH and KOH, at a collective concentration of approximately 50 wt % of the treatment solution, components of such treated crude oil will begin gelling at approximately 0° C.-⁻5° C., whereas if the same crude oil is treated using a treatment solution containing NaOH and KOH in a ratio of 19:1 at a collective concentration of approximately 50 wt % of the treatment solution components of such treated crude oil will begin gelling at approximately 5° C.

In the treatment process according to the exemplary embodiments of the present invention, appropriate amounts of the inventors' recently proposed treatment solution for treating contaminated liquids and the additional component(s) that prevent formation of precipitate(s), scaling, and the like, and any anti-freezing or anti-gelling agent may be separately added to the liquids being treated or, in the alternative, one or more of the additional components may be added to the recently proposed treatment solution to form a modified treatment solution, which is then added in an appropriate dosage to the liquids being treated. The alternative approach is more convenient as a practical matter because the modified treatment solution may be prepared in advance at any convenient location, transported in a single container to another location where it is added to the liquid being treated, and permits all components to be added simultaneously to the liquid being treated. Although some of the various components may react with each other in such a modified treatment solution prior to being added to the liquid being treated, the amount of such reactions is small and this does not significantly reduce the effectiveness of treatment process in comparison to a treatment process in which each of the several components is added separately to the liquid being treated. Thus, for example, appropriate amounts of the organic acid(s), the MEA and/or the anti-gelling agent may be added to a given volume of the inventors' recently proposed treatment solution so as to form a modified treatment solution so that when a quantity of the modified treatment solution is then added to a given volume of the liquid being treated, each of the components will be at the appropriate dosage rate for the given volume of the treated liquid.

An exemplary modified treatment solution according to the present invention may be formed by combining 1-15 ml of an aqueous solution containing 5% volume of the organic acid(s) in water and 0.05-0.5 ml of MEA per liter of the recently proposed treatment solution containing a total hydroxide concentration of 35-55 weight percent, and preferably at least 45 weight percent, in water. The modified treatment solution may then be added to the liquids being treated at appropriate dosage rates, which may substantially correspond to the standard dosing range as discussed in relation to the inventors' recently proposed treatment process, i.e., a range of 0.25-6.0 ml/liter of the liquid being treated, preferably within a range of 1.0-5.0 ml/liter of the liquid being treated, noting that the amounts of organic acid(s) and MEA being combined with the recently proposed treatment solution in forming a modified treatment solution amount to approximately 1% of the modified treatment solution. The comparatively small amount of the organic acid(s) included in the modified treatment solution does not substantially change basic characteristics imparted by the much larger quantity of hydroxide(s), and the modified treatment solution will have a pH substantially corresponding to that of the treatment solution not including the organic acid(s), e.g., 13-14, and the modified treatment solution will increase the pH of the liquids being treated to essentially the same extent as the recently proposed treatment solution not including the organic acid(s).

Again, the main important advantages achieved with the treatment process according to the present invention are the efficient remediation of $H_2S$ and other contaminants in the liquids being treated down to safe, acceptable levels while preventing precipitate(s), scaling and the like from being generated and released from the treated liquids while the liquids are being treated, transported and stored for time periods of hours, days and weeks, and without detrimentally affecting the treated liquids. For avoiding formation of precipitate(s), scaling and the like, the amount of the inventors' recently proposed treatment solution used in the treatment process should be kept within the standard range discussed herein because addition of an excessive amount of the recently proposed treatment solution tends to promote formation of precipitate(s), scaling and the like. When the treatment process of the present invention involves use of a modified treatment solution such as discussed above, even if the amount of the modified treatment solution added/liter of a treated liquid is increased beyond the standard dosing range, the amounts of organic acid(s) and MEA are proportionally increased together with the amount of hydroxide(s) in the modified treatment solution and will normally still function to assure that substantially no precipitate(s), scaling or the like will be formed from the treated liquids while they are being treated, transported and/or stored for a period of time, even though the increased dosage of the hydroxide(s) added in the treatment process may otherwise normally tend to generate some precipitate(s), scaling or the like in the treated liquids if the organic acid(s) and MEA were not also present.

Of course, it is also possible to separately increase the amount of organic acid(s) and/or MEA added in the modified treatment solution according to the present invention, without increasing the amount of hydroxide(s) and other components. For example, if a treated liquid such as crude oil has a particularly high $H_2S$ concentration or the treated oil is to be transported or stored for an extended period of time, e.g., 1-3 months, additional amount(s) of the organic acid(s) and/or the MEA above the normal dosage ranges discussed above may be added to the treated liquid to better assure that no precipitate(s), scaling or the like will be released from the treated liquid during the extended period of time. This would typically not create any problems for the treated liquid, although it would increase the cost of the treatment process somewhat.

Examples of Treatment Processes According to the Present Invention

Following are some examples of treatment processes using a treatment solution according to the present invention. A first group of ten (10) examples is presented in Table 1 below, in which different amounts of a modified treatment solution according to the present invention were added to 100 ml of a crude oil having an API gravity of 34 and containing 40,000 ppm of $H_2S$, while the crude oil was being mixed at 300 rpm at a temperature of 21° C. The modified treatment solution used in these examples combined a primary-large amount of the inventors' recently proposed treatment solution and smaller amounts of fulvic acid and MEA, such that the modified solution contained, per liter: approximately 50 wt % collectively of NaOH and KOH, with NaOH accounting for approximately 49.5 wt % and KOH accounting for approximately 0.5 wt %; 0.1 wt % Potassium silicate $K_2SiO_3$; 1.0 wt % fulvic acid having a molecular formula of $C_{14}H_{12}O_8$ and molecular weight of 308.2 g/mol; and 0.3 wt % MEA. The mixing had negligible effect on the volume of precipitate(s) produced. The several components of the treatment solution were combined prior to being added to the crude oil in each of the Examples.

TABLE 1

| Example No. | Dosage Amount | Reaction Time | Residual Amount $H_2S$ | Amount of Precipitate* |
|---|---|---|---|---|
| 1 | 0.1 ml | 45 minutes |  | 0.0 ml |
| 2 | 0.3 ml | 45 minutes |  | 0.0 ml |
| 3 | 0.5 ml | 45 minutes |  | 0.0 ml |
| 4 | 0.8 ml | 45 minutes |  | 5.0 ml |
| 5 | 1.0 ml | 45 minutes |  | 7.5 ml |
| 6 | 0.1 ml | 30 minutes | 30 ppm |  |
| 7 | 0.3 ml | 30 minutes | 12 ppm |  |
| 8 | 0.5 ml | 30 minutes | 5 ppm |  |
| 9 | 0.8 ml | 30 minutes | 3 ppm |  |
| 10 | 1.0 ml | 30 minutes | 0 ppm |  |

*Precipitate is solid yellow liquid which tested positive for elemental sulfur, no solid matter.

As shown in Table 1, even though the amount of $H_2S$ in the crude oil was fairly high at 40,000 ppm, the effectiveness in remediating the $H_2S$ was generally effective. At a dosage of 0.1 ml of the treatment solution $H_2S$ content was greatly reduced down to 30 ppm, and $H_2S$ content was progressively further reduced to 5 ppm with a dosage of 0.5 ml, and to 0 ppm $H_2S$ when 1.0 ml dosage of the treatment solution was added. On the other hand, no precipitate(s) were formed until the dosage rate was increased to 0.8 ml, which corresponds to 8 ml/liter of the crude oil, and is above the 6 ml upper limit of the standard dosage rate for the inventors' recently proposed treatment solution. Further the reaction times were fairly short, even though the treated liquid was being mixed which would normally reduce the time required for completely reacting the treatment solution with the $H_2S$ in the crude oil. If there is no restriction on the amount of time permitted for reacting the treatment solution according to the present invention with the $H_2S$ in the crude oil, a lesser amount of the treatment solution will be sufficient for reducing the $H_2S$ content down to 5 ppm or less, e.g., a 2.5 ml dosage may have been sufficient to reduce the $H_2S$ content down to 0 ppm had more time been permitted.

Example 11

In this example, the liquid being treated was a light, hydrotreated, petroleum distillate with an API gravity of 53° containing 40,000 ppm $H_2S$ vapor (as determined by ASTM D5705), 41 ppm mercaptan sulfurs (as determined by UOP163) and 33 ppm of $H_2S$ in liquid (as determined by UOP163), while the same formulation of the modified treatment solution was used as in Examples 1-10, and was added at a dosage rate of 10 ml/liter of the liquid being treated (1% based on volume). All testing for this Example was performed by a major, accredited testing lab. The several components of the treatment solution were combined prior to being added to the petroleum distillate, and once added were permitted to naturally migrate through the petroleum distillate without any mixing at a temperature of approximately 21° C. The treated liquid was tested for $H_2S$ content thirteen (13) minutes after the treatment solution was added thereto, and the results showed 0 ppm $H_2S$ vapor (as determined by ASTM D5705), <0.2 ppm mercaptan sulfurs (as determined by UOP163) and <1.0 ppm of $H_2S$ in liquid (as determined by UOP163). Moreover, the same sample was stored for one month heated to elevated temperatures as high as 148° C. and again tested for $H_2S$ content, which showed essentially the same results of 0 ppm $H_2S$ vapor and nearly 0 ppm $H_2S$ in the liquid, confirming that the $H_2S$ remediation by the treatment process is not reversible.

Additional testing was performed on the petroleum distillate before and after treatment pertained to sodium content, as well as HDST—Hydrocarbon Distribution, and Total Light Ends. This testing showed: an increase of sodium content from 2 mg/kg before treatment to 40 mg/kg after treatment, which is well within acceptable levels; no adverse effects in the recovery or residue of the petroleum distillate, and appropriate ASTM repeatability for the methods D7169 and D2887; and a slight but desirable increase in hexanes, pentanes and butanes of the Total Light Ends (as determined by ASTM method D7900). The major testing lab which performed the testing further commented that: testing was performed using the most in-depth procedures, including full crude assays, full fractional distillations, etc., and they noted no negative effects, differences or variations on the product or fractions, the fractions balanced out, the fraction boiling points were well within repeatability requirements, the total light ends were slightly improved, and most importantly the $H_2S$ remained mitigated after passage of time and heating to elevated temperatures.

Example 12

In this Example, the treatment solution used in Examples 1-11 was tested for corrosiveness of aluminum and steel specimens via testing method UNECE Section 37.4. The treatment solution was added to a crude oil with an API gravity of 33° containing 4,000 ppm $H_2S$ vapor at a dosage rate of 10 ml/liter of the chide oil (1% based on volume) and allowed to migrate through the crude oil for 30 minutes. Then the specimens were either immersed or half immersed in the treated liquid, or exposed to a gas of the treated crude oil, and in each case the testing lasted for 168 hours. Mass loss of the specimens was detected after 168 and for each tested specimen 0.0% mass loss was detected. Essentially, it was found that the crude oil as treated with approximately 1.5 times the normal dosage of the treatment solution was not corrosive to metals. The tests were also conducted for the crude oil which was treated with higher dosages of the treatment solution, and it was not until the dosage amount was increased to ten times the normal dosage amount that the aluminum specimens began to show some mass loss after 168 hours, e.g., they became slightly pitted.

The foregoing description is given for clearness of understanding only, and no unnecessary limitations should be understood therefrom, as modifications within the scope of the invention may be apparent to those having ordinary skill in the art and are encompassed within the scope of the invention.

We claim:

1. An aqueous based treatment solution for remediating hydrogen sulfide ($H_2S$) and other contaminants in liquids and substantially without formation of precipitate, the treatment solution comprising:
   at least one hydroxide compound;
   at least one organic acid selected from a group consisting of a fulvic acid and a humic acid; and
   water, wherein
   a collective concentration of the at least one hydroxide compound in the treatment solution is in a range of 35-55 weight %,
   a content of water in the treatment solution is at least 30 weight %,
   the aqueous based treatment solution has a pH of at least 13, and
   a collective concentration of the at least one organic acid in the treatment solution is at least 0.01 weight %.

2. The treatment solution according to claim 1, wherein the collective concentration of the at least one hydroxide in the solution is 45-55 weight %.

3. The treatment solution according to claim 1, wherein the treatment solution contains at least two different hydroxide compounds.

4. The treatment solution according to claim 1, wherein the treatment solution contains sodium hydroxide (NaOH) and potassium hydroxide (KOH).

5. The treatment solution according to claim 1, wherein the collective concentration of the at least one organic acid in the solution is 0.01-10 weight percent.

6. The treatment solution according to claim 1, further comprising monoethanolamine (MEA) and a concentration of MEA in the treatment solution is at least 0.05% volume.

7. The treatment solution according to claim 6, wherein a concentration of MEA in the treatment solution is 0.05-2.0% volume.

8. The treatment solution according to claim 1, further comprising at least one of a silicate compound and barium as an antibacterial agent.

9. The treatment solution according to claim 1, wherein the collective concentration of the at least one organic acid in the treatment solution is 0.01-1.0 weight %.

10. The treatment solution according to claim 1, wherein the at least one organic acid includes a fulvic acid.

11. The treatment solution according to claim 1, wherein collectively the at least one hydroxide compound and water constitute at least 95 wt % of the aqueous based treatment solution.

12. A treatment process for preparing a remediated liquid from a contaminated liquid originally containing more than 5 ppm hydrogen sulfide ($H_2S$) and substantially without formation of precipitate, comprising steps of:
   preparing an aqueous solution containing at least one hydroxide compound, in which a collective concentration of the at least one hydroxide compound in the aqueous solution is in a range of 35-55 weight % and a content of water is at least 30 weight %, and the aqueous solution has a pH of at least 13;
   adding the aqueous solution to the contaminated liquid at a dosage amount which provides a concentration of the at least one hydroxide compound within a range of 125-5000 ppm of in the contaminated liquid;
   adding at least one organic acid selected from a group consisting of a fulvic acid and a humic acid to the contaminated liquid at a dosage amount which provides a concentration of the at least one organic acid of at least 0.01 ppm in the contaminated liquid; and
   dispersing the aqueous solution and the at least one organic acid in the contaminated liquid and allowing the aqueous solution and the at least one organic acid to react with the contaminated liquid for a period of time until a concentration of hydrogen sulfide in the contaminated liquid is reduced to ≤5 ppm.

13. The treatment process according to claim 12, wherein the dosage amount of the aqueous solution added to the contaminated liquid provides a concentration of the at least one hydroxide compound within a range of 500-2500 ppm in the contaminated liquid.

14. The treatment process according to claim 12, wherein the at least one organic acid is added at the dosage amount which provides a concentration of the at least one organic acid of 0.1-10 ppm in the contaminated liquid.

15. The treatment process according to claim 12, further comprising the step of adding monoethanolamine (MEA) to the contaminated liquid at a dosage amount which provides a concentration of 0.5-15 ppm MEA in the contaminated liquid.

16. The treatment process according to claim 12, wherein the aqueous solution contains at least two different hydroxide compounds.

17. The treatment process according to claim 12, wherein the contaminated liquid is a hydrocarbon based liquid.

18. The treatment process according to claim 12, wherein the at least one hydroxide compound in the aqueous solution is selected to achieve a specific freezing temperature for the aqueous solution of 0° C. or less.

19. The treatment process according to claim 12, wherein the at least one organic acid includes a fulvic acid.

20. The treatment process according to claim 12, wherein collectively the at least one hydroxide compound and water constitute at least 95 wt % of the aqueous based treatment solution.

* * * * *